United States Patent [19]

Hansen

[11] Patent Number: 4,929,878
[45] Date of Patent: May 29, 1990

[54] MEMORY MIRROR CONTROL SYSTEM FOR VEHICLES AND THE LIKE

[75] Inventor: Randall F. Hansen, Dearborn, Mich.

[73] Assignee: United Technologies Automotive, Inc., Dearborn, Mich.

[21] Appl. No.: 372,500

[22] Filed: Jun. 27, 1989

[51] Int. Cl.$^5$ .......................... G05B 19/19; G02B 7/18
[52] U.S. Cl. .................................... 318/560; 318/569; 318/575; 318/468; 318/101
[58] Field of Search ............... 318/560, 562, 563, 565, 318/569, 575, 466, 467, 468, 286, 266, 34, 51, 53, 101; 364/424.05

[56] References Cited

U.S. PATENT DOCUMENTS

| | | |
|---|---|---|
| 4,267,494 | 5/1981 | Matsuoka et al. |
| 4,540,252 | 9/1985 | Hayashi et al. .................. 318/466 X |
| 4,609,265 | 9/1986 | McKee et al. ................... 318/467 X |
| 4,678,295 | 7/1987 | Fisher .................................. 350/634 |
| 4,682,088 | 7/1987 | Sullivan ........................... 318/466 X |
| 4,706,194 | 11/1987 | Webb et al. |
| 4,727,302 | 2/1988 | Mizuta et al. .................... 318/466 X |
| 4,798,967 | 1/1989 | Yamana et al. .................. 318/466 X |

*Primary Examiner*—Bentsu Ro

[57] ABSTRACT

A mirror control system for electrically powered and positioned mirrors (FIG. 1) of the "memory" type for, for example, moving an automotive side view mirror from its current position to a desired "memory" position, and a special algorithm therefor (FIG. 2), which initially moves the mirror toward the final, desired position at a forty-five (45°) degree angle to the vertical and horizontal axes (NE, NW, SW or SE; FIG. 6), for a mirror whose two directional motors have equal speeds (X=Y). If no obstruction (e.g., the mirror's edge) is encountered (FIG. 3), the mirror is moved by both motors until either the vertical or horizontal axis of the final position is encountered, at which axis intersection point the mirror is moved by only the appropriate one of the motors until the final point along the remaining axis is reached; this is the "normal" mode of the algorithm. However, if an obstruction is encountered (left side of FIG. 2; FIGS. 4 and 5), the mirror is moved at a 45° degree angle toward its center point (or a "safe" central position) until its reaches either the center point's vertical (FIG. 4) or horizontal (FIG. 5) axis, and then a single motor is used until the center point is reached. THe analogous "normal" mode is then used to move the mirror to its final position. If the speeds of the horizontal axis and vertical axis direction motors are not equal (X≠Y, respectively), then the angle for the initial movement(s) is "arc tangent (Y÷X)".

18 Claims, 3 Drawing Sheets

MEMORY MIRROR CONTROL SYSTEM FOR VEHICLES AND THE LIKE

TECHNICAL FIELD

The present invention relates to electrically powered or positioned mirrors of the type used, for example, on vehicles for side viewing and the like, which mirrors have "memory," and more particularly to the powered control of such mirrors, and even more particularly to an algorithm used in the control of such mirrors in moving the mirror from an off-set position to a "memory" encoded position.

BACKGROUND ART

It has become the practice to fit some vehicles with "memory" mirrors, that is, one or more mirrors for which desired position(s) are encoded and hence "remembered" for at least the vehicle's "primary" driver. Such "memory" mirrors provide for the automatic re-positioning of the vehicle's mirror(s), typically by the driver, when the mirror(s) have been moved out of their desired position(s) by, for example, another driver.

In such "memory" mirror systems, after they have been "programmed," the primary driver, for example, may automatically reposition at least one mirror, including possibly the left and right view mirrors and the rear view mirror, of the vehicle by initiating the "memory" system. The system then moves the memory mirror(s) back into their selected memory positions using typically two directional motors per mirror, one for each axis (left/right mirror movement about a "vertical" axis and up/down mirror movement about a "horizontal" axis). Typically, in the prior art the motor for one axis will be initiated first, until the corresponding axis of the "memory" position is reached; and then the first motor is shut "off," while the other motor for the other axis is turned "on," until finally the other co-ordinant of the "memory" position is reached.

For general background information, reference is had to the following patents (there of course being many other patents relevant to the art of "memory" mirrors):

| Patent No. | Patentee(s) | Issue Date |
| --- | --- | --- |
| 4,267,494 | Matsuoka et al | May 12, 1981 |
| 4,706,194 | Webb et al | Nov. 10, 1987 |

However, this approach of running only one motor "on" at a time takes more time than is necessary, and it is desirable from a time standpoint to run both motors at the same time for as much of the path as possible, in order to shorten the time from initiating the control to reaching the desired mirror position. However, one difficulty in designing any standard control algorithm for automatic mirror movement for concurrently running both motors is the different shape or pattern of mirror travel, which may be encountered from one car model to another.

Thus, a mirror designed for one application may differ from other mirrors. A good example is an automotive application, in which the mirror for a "Lincoln Town Car" (which has a generally rectangular configuration) has a much different pattern of mirror travel than the mirror for a "Ford Thunderbird" (which has a generally circular configuration).

Thus, in order to have both mirror motors "on" and hence achieve the time advantage, it would have appeared necessary that the "memory" system be separately programmed for each type and configuration of mirror. This would greatly complicate any standardization effort, requiring, for example, the inventorying of differently programmed memory mirror systems for the different types and configurations of memory mirrors, although the hardware elements would otherwise all be the same.

However, in contrast, the "memory" mirror control system and the algorithm of the present invention achieve the desirable "both motors 'on'" but by design through an "obstruction avoidance" feature adapts to most mirror patterns, including, for example, both rectangular and circular type mirrors. This allows the invention to be used in many applications, including particularly, for example, all typical automotive applications.

DISCLOSURE OF INVENTION

The memory mirror control system of the present invention utilizes a unique algorithm controlling the movement of the mirror(s), which allows both motors to be "on" for most of the travel, but also provides obstruction avoidance features, if an obstruction (e.g., the mirror's edge), is encountered when the mirror is being moved. This allows the same system and algorithm to be used for all types and configurations of mirrors, which are controlled about at least two axes.

In the invention, analog position sensors are mounted on each mirror, one for sensing up-down travel and the other for sensing left-right travel and determining the current position of the mirror with respect to the vertical and horizontal axes. The position of each mirror is read and compared to position(s) stored in the memory of the controlling device.

The memory mirror control algorithm of the present invention then determines which direction the respective mirror should move to reach the memory or final, desired position.

Both motors are turned "on" in the appropriate directions to move the mirror toward the desired "memory" position. Once one of the axes of the desired position is reached, the motor moving the mirror about the axis that has been reached is shut "off" and the remaining motor is left "on," until the other axis of the desired "memory" position is reached, and then it is also shut "off."

However, if the mirror does not reach the desired final position, and in particular the analog sensor inputs indicate that the mirror travel has been stopped due to an "obstruction," the algorithm of the invention moves the mirror to the center or origin (0, 0) of the mirror movement pattern area. An obstruction is defined as the limits of the mirror travel due to the physical constraints of the housing or the mounting methods used in the construction of the mirror.

Once the mirror reaches the center position, the initiating procedure (both motors "on" in the then appropriate directions) is followed once again to reach the final desired position.

This procedure was conceived to ensure that the final desired mirror position could be achieved from any starting point without fear of interference from obstruction, the location of which varies from mirror type to mirror type.

For enhanced accuracy the final desired position preferably is rechecked for accuracy, after both axes of movement have been completed. Once this second check is completed, the automatic movement procedure is finished.

As also is true of the prior art, storage of memory positions is achieved by activating a sequence of digital inputs. Once this sequence of inputs is decoded, the analog inputs are read and stored in a memory location corresponding to that particular, desired mirror position. The positions which are stored are recalled during automatic positions as the "final, desired mirror position."

In the preferred embodiment of the invention the criteria for the movement for each memory mirror, in which each mirror has direction motors with the same speed, is as follows:

1. The mirror initially is directed to move at a forty-five (45°) degree angle toward the desired position, until either the vertical or horizontal position is reached. Once at that position, it is only necessary to travel in one axis direction (either horizontally or vertically) to reach the final desired position.

This is the quickest and most direct way to get to the final, desired position. Moving toward the desired position at a forty-five (45°) degree angle is as direct as possible for any up-down and left-right motor configuration. This method will also work for most mirror movement patterns.

2. If the algorithm senses that an obstruction has been encountered while traveling, each mirror will be directed to a center or central position of the mirror, using the analogous procedure followed in step 1, supra. Once at the center or central position, the algorithm will direct the mirrors to the desired final position using the analogous procedure of step 1.

The purpose of this "centering" feature is to adapt to the limits of mirror travel imposed by different shapes and patterns of the mirror, as earlier mentioned, while allowing the same algorithm to be used for all of these different shapes and patterns. The most likely "obstruction" scenario will occur, when a mirror is near an edge of the mirror travel pattern and the desired "memory" position is also near an edge of permissible mirror travel. These limits or obstructions may not be encountered often, but they are handled efficiently in the invention, if and when they occur.

Thus, the algorithm uses a unique and uncomplicated method of avoiding movement problems. One advantage is that the centering algorithm uses the desired "both motors 'on'" movement method, with only slight modifications necessary to center the mirror. This requires very little additional memory and executable instructions and yet permits standardization of the programmed hardware for all of the various vehicular mirror shapes and movement patterns.

Although there are other ways of handling this type of obstruction avoidance than that of the invention, they are more complicated and therefore may decrease the reliability of the system. Also, these other methods require significant increases in memory locations and additional executable instructions and calculations. These in turn require more expensive hardware to implement. Accordingly, they currently are not as preferred as the exemplary algorithm detailed below.

In summary, for direction motors of the same speed, the forty-five (45°) degree direction, namely, NorthEast (NE), NorthWest (NW), SouthWest (SW) or SouthEast (SE), in which the mirror must travel in order to reach the desired, "memory" position is determined by comparing the present position's co-ordinants to those of the "memory" position. Both motors are turned "on," causing the mirror to travel along a forty-five (45°) degree path until either the vertical or horizontal axis of the "memory" position is intersected; and then the un-needed motor is turned "off" and the remaining motor left "on" until the final destination point is reached.

If an obstruction is reached, the mirror then is driven to a "safe" central position or region, and the forty-five (45°) degree process repeated.

Additionally, the innovative principles of the foregoing algorithm will also work even if one of the direction motors operates at a faster rate or speed than the other, i.e., when their speeds (X and Y) are not equal (X≠Y). The only effect is that the movement angle will be greater or less than forty-five (45°) degrees, depending on the relative speeds of the direction motors. The ideal is to have both motors concurrently running as long as possible in reaching the desired point, which effectively speeds up the process.

The invention may be practiced in a wide variety of applications, including but certainly not restricted to the side view memory mirrors on a vehicle, utilizing known technology, in the light of the teachings of the invention, which are discussed in detail hereafter.

Other features and advantages will be apparent from the specification and claims and from the accompanying drawings, which illustrate at least one exemplary embodiment of the invention.

BEST MODE FOR CARRYING OUT THE INVENTION

Figure 1:
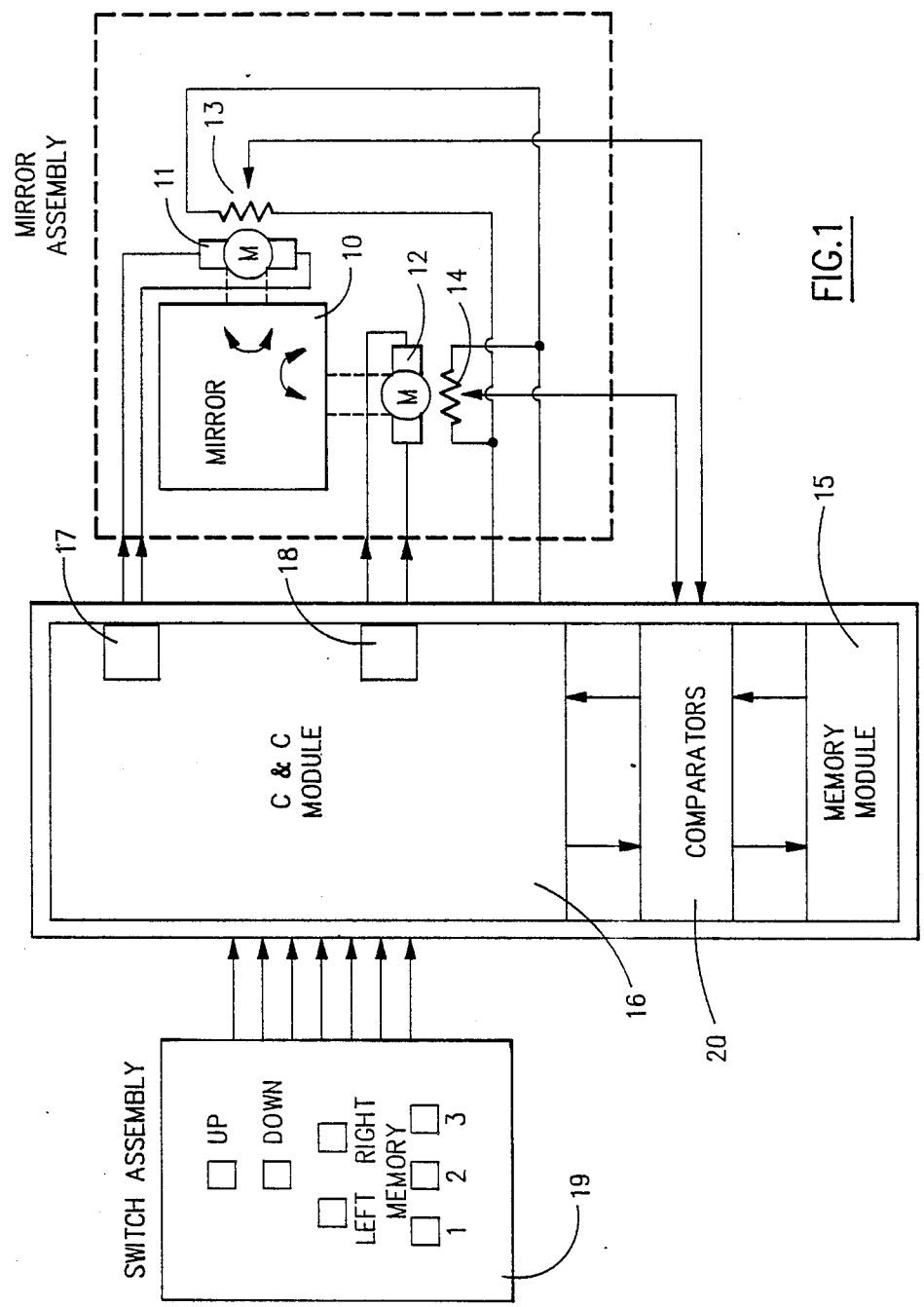
FIG. 1 is a generalized view, of the exemplary hardware items of the exemplary embodiment of the memory mirror control system of the present invention.

Exemplary Memory Mirror System (FIG. 1)

As can be seen in FIG. 1, an exemplary mirror assembly includes a driver side view mirror 10 with two direction motors—a vertical direction motor 11, which moves the mirror "up" or "down" about the horizontal axis, depending on the direction of motor rotation; and a horizontal direction motor 12, which moves the mirror "right" or "left" about a vertical axis, depending on the direction of motor rotation. The vertical and horizontal axes are, of course, orthogonal to each other.

In accordance with the invention, position sensors 13 and 14 are included as part of the mirror assembly. The sensors 13 and 14 produce electrical signals indicative of the relative position of the mirror 10 at any particular point in time with respect to its relative vertical and horizontal position aspects in relation to, for example, its center or mid-way or neutral position (0, 0). Many sensors are available and known to the art and typically would be ratiometric in nature and mounted on and geared to its respective motor (11, 12, respectively)

A memory module 15 stores the recorded or encoded information indicative of at least one desired "memory" position for the mirror, typically for at least the primary driver of the vehicle. However, of course, more than one "memory" position is possible, and the exemplary manual control panel or switch assembly 19 illustrated in FIG. 1 includes an exemplary three programmable positions (note buttons "1", "2" and "3").

Associated with the memory module 15 and the power supply for the motors 11, 12 is an electronic computation and control module 16. The computation and control module 16 includes a microprocessor central processor unit (CPU) and associated circuitry for appropriately turning or switching the mirror direction motors "on" in the desired direction of rotation and "off" through switches 17 and 18 in accordance with, for example, the algorithm of the present invention discussed below. The switches 17 and 18 typically determine the direction of the current (note the alternative, directional arrows coming from the switches) through its respective motor and hence determine the direction of rotation of the shaft of the motor and thus the direction of movement of the mirror 10.

The computational and control module includes a series of comparators 20, which compare relative values and generate or assist in the generation of certain electrical signals, depending on whether the values are equal or not and which value being compared is greater than the other. This is continually done in cycles, as frequently as desired, and typically might be done every ten milliseconds (10 msec.).

The memory module 15, the computational and control module 16, the comparators 20, and the switches 17 and 18 for the motors typically will be included on or in conjunction with one or more printed circuit boards (PCBs), either located totally within the vehicle door or totally or partially in the body of the main vehicle with appropriate wiring to the motors 11, 12 and the "manual" controls 19 for the mirror.

The details of the "hardware" of FIG. 1 are not part of the present invention and many various components, circuitry and arrangements are available in the various arts involved, and some examples of possible components are described in the above cited prior patents.

Figure 2:
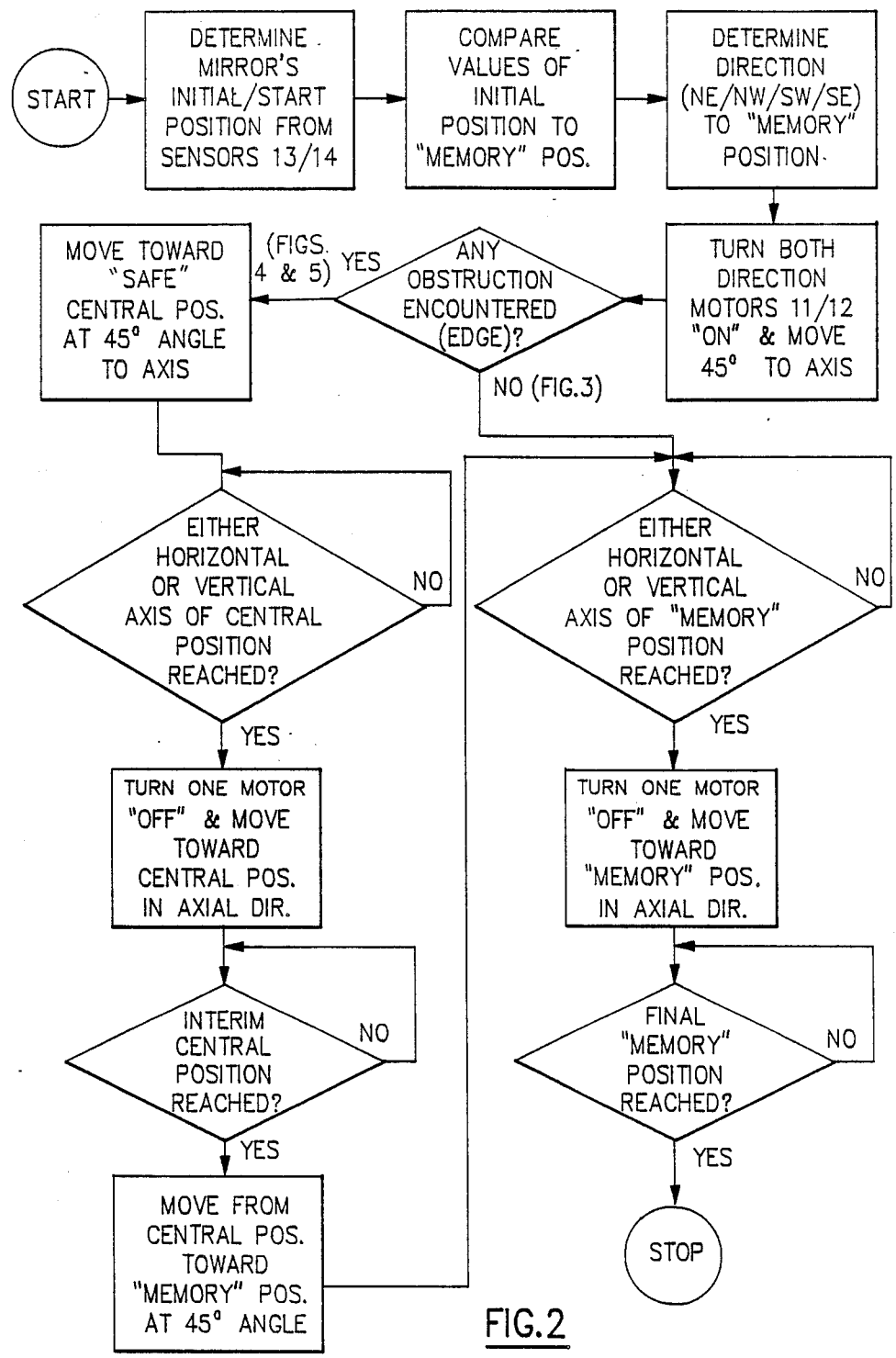
FIG. 2 is a flow chart diagram setting forth the steps of the exemplary algorithm used in the preferred, exemplary embodiment of the memory mirror control system of the present invention.

Algorithm of Invention (FIG. 2)

Figure 6:
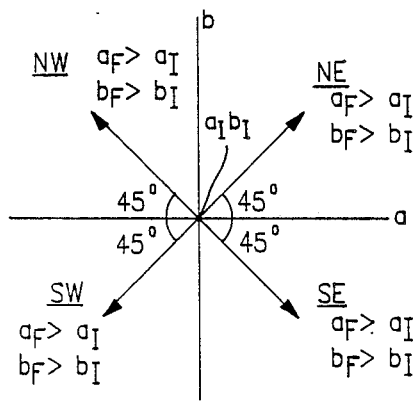
FIG. 6 is a graph showing the initial, four possible forty-five (45°) degree angles of travel (NE, NW, SW and SE) under the algorithm of FIG. 2, depending on the relative differences between the vertical and horizontal aspects of the initial and final positions of the mirror.

As can be seen in the flow chart of FIG. 2, when the exemplary algorithm of the present invention is started, the current and final or "memory" positions of the mirror are determined, the former from the position sensors 13 and 14 and the latter from the memory module 15. Assuming that the two positions are not equal in either their vertical or horizontal aspects, the mirror then is initially moved toward the direction of the final position at an angle of forty-five (45°) degrees with both direction motors "on." The below matrix, illustrated in graphical form in FIG. 6, summarizes this preliminary determination, in which "$a_L$" equals the current or initial, horizontal location of the center of the mirror, and "$b_L$" equals the current or initial, vertical location of the center of the mirror; and "$a_F$" equals the final or memory, horizontal location desired for the center of the mirror, and "$b_F$" equals the final or memory, vertical location desired for the center of the mirror.

| Condition | Action |
|---|---|
| If $a_F > a_I$, | turn the horizontal direction motor 12 "on" in the "right" direction, or |
| if $a_F < a_I$, | turn the horizontal direction motor 12 "on" in the "left" direction; and |
| if $b_F > b_I$, | turn the vertical direction motor 11 "on" in the "up" direction, or |
| if $a_F > a_I$, | turn the vertical direction motor 11 "on" in the "down" direction. |

Of course, if either $a_L=a_F$ or $b_L=b_F$, only the "nonequal" motor needs to be turned "on" in the appropriate direction; and, if both are equal, no movement is necessary, as the two points (initial and final) are one and the same. Under these relatively rare conditions the algorithm of FIG. 2 is not needed.

With respect to additional nomenclature, it is noted that in the following discussions "$a_X$" represents the abscissa and "$b_Y$" represents the ordinate of the mirror's center at any, general interim path position; while "$a_C$" is the abscissa and "$b_C$" is the ordinate of the mirror, when the mirror is centered (0, 0) or in its midway position or is in another "safe" central position (determined by comparative logic, as discussed more fully below).

After the initial motor movements have been actuated, if no obstruction is ever encountered in the initial path and, when either the vertical or horizontal axis value of the final, desired point is reached (either $a_X=a_F$ or $b_Y=b_F$), the "equal" motor is turned "off," and the mirror is then moved toward the desired position in a single, axial direction only, by sending the appropriate switching signal(s) ("on"/"off") to the direction motors and/or their power supplies. When the final, desired position point is reached (both $a_X=a_F$ and $b_Y=b_F$), the remaining active motor is turned "off."

The foregoing is considered the "normal" path of movement and is further discussed in connection with FIG. 3, infra.

Figure 4:
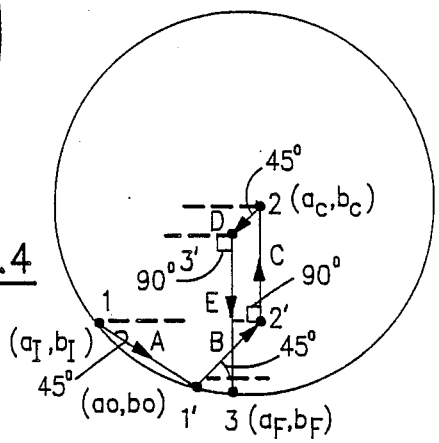
FIG. 4 is a generalized diagram illustrating the mirror movement under the algorithm of the present invention when it encounters a mirror-movement-limiting obstruction in one exemplary path for a mirror having a circular configuration.
Figure 5:
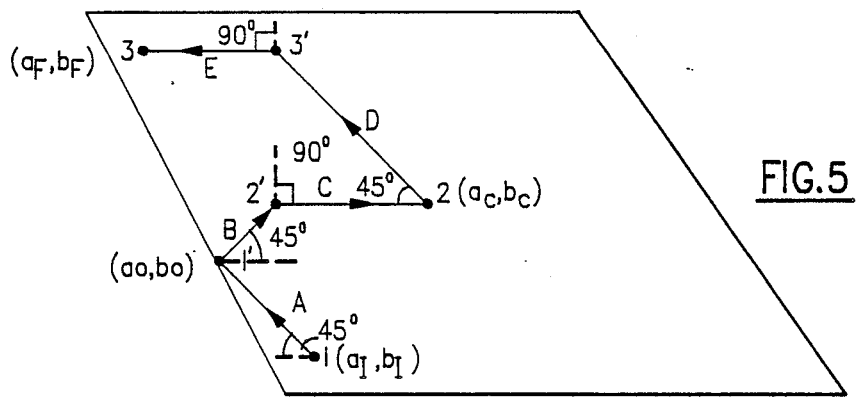
FIG. 5 is a generalized diagram illustrating the mirror movement under the algorithm of the present invention when it encounters a mirror-movement-limiting obstruction in a second exemplary path to that illustrated in FIG. 4, but for a mirror having a parallelogram configuration.

On the other hand, if an obstruction (e.g., one of the mirror's edges) is encountered (see subroutine on the left side of FIG. 2), the mirror is moved toward a center position ($a_C$, $b_C$; or some other, "safe" central position or region) at an angle of forty-five (45°) degrees with both motors concurrently "on" in the appropriate directions, until either the vertical or the horizontal axis of the center/central position is encountered (either $a_X=a_C$ or $b_Y=b_C$; FIGS. 4 or 5, infra, respectively). At that axis intersection point, the mirror is then moved toward the center or central position in a single axial direction only, by continuing the appropriate motor "on" and turning the other motor "off" by sending the appropriate switching signal(s) ("on"/"off") to the direction motors and/or their power supplies through the switches 17 and 18.

When the center/central position is reached (both $a_X=a_C$ and $b_Y=b_C$), the mirror is moved with both motors concurrently "on" toward the final, desired position ($a_F$, $b_F$), again at an angle of forty-five (45°) degrees to the axes, until either the vertical or the horizontal axis value of the final position is encountered (either $a_X=a_F$ or $b_Y=b_F$; FIGS. 4 or 5, infra, respectively). At that axis intersection point, the mirror is then moved toward the final, desired position in a single axial direction only by appropriately signaling the motors; until the final, desired position (both $a_X=a_F$ and $b_Y=b_F$) is reached, at which point the remaining "on" motor is turned "off."

It is noted that an obstruction is indicated or its presence determined when, after a period of time (e.g. a half second) covering a multiple number of cycles, the sensed position being measured by the sensors 13 and 14 does not change, i.e. $a_X=k_1$ and $b_Y=k_2$, where $k_1$ and $k_2$ are constants. Also, the center position (0, 0) is typically always a standard specification for each mirror and hence "universally" is a known value.

Figure 3:
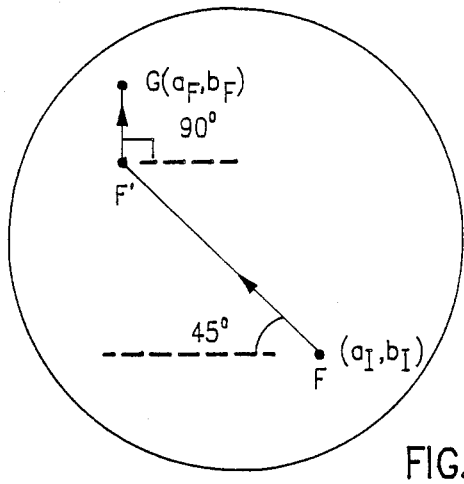
FIG. 3 is a generalized diagram illustrating the mirror movement under the algorithm of the present invention when the mirror is being moved in a "normal" manner, i.e. when no mirror-movement-limiting obstruction is encountered throughout the complete movement of the mirror, from its initial position to its final, desired position.

"Normal" and "Obstructed" Movement (FIGS. 3–5)

The mirror path diagrammatically illustrated in FIG. 3 represents a "normal" movement of a mirror according to the exemplary algorithm of the present invention, that is, one in which no mirror-movement-limiting obstruction is encountered throughout the complete movement of the mirror, from its initial position F to its final, desired position G. The solid, arrow-headed lines in the figure analogously represent the travel of the mirror under the control of the algorithm.

In considering the allowed pattern of mirror movement as contained in the circular type mirror represented in FIG. 3, the exemplary algorithm of the present invention causes the mirror initially to move from the initial, starting point F at an angle of forty-five (45°) degrees in the NW direction under the driving action of both motors 11 and 12 until the intermediate point F' is reached. Intermediate point F' represents the point at which the vertical axis of the final desired position G has been intersected ($a_X=a_F$). The mirror then travels under the control of the algorithm along the vertical axis illustrated [i.e., at ninety (90°) to the horizontal] under the driving action of the horizontal axis motor 11 alone until the final, desired position represented by point G is reached ($a_X=a_F$). This represents the quickest way to reach the desired position G, when the drive motors for the mirror have the same speed.

The mirror paths diagrammatically illustrated in FIGS. 4 and 5 represent two "obstructed" movements of the mirror according to the exemplary algorithm of the present invention, that is, one in which a mirror-movement-limiting obstruction is encountered during the movement of the mirror, from its initial position 1 to its final, desired position 3. In these two exemplary cases the obstruction is the edge of allowed mirror travel for two different movement patterns, with FIG. 4 representing a circular mirror and FIG. 5 representing a rectangularly configured mirror. Again, as in FIG. 3, the solid, arrow-headed lines in the figures analogously represent the travels of the mirror under the control of the algorithm.

For the mirror movements illustrated in FIGS. 4 and 5, from the initial, starting position 1, the mirror initially travels at an angle of forty-five (45°) degrees to the horizontal under the driving action of both motors 11 and 12 in the direction (SE and NW, respectively) of the desired, final point 3 along line A, until an obstruction (the edge) is encountered at point 1', which is the obstructed point ($a_O$, $b_O$),. The algorithm then directs the mirror to move again at a forty-five (45°) degree angle to the horizontal under the driving action of both motors 11 and 12 in the direction (NE for both) of point 2, the center (0, 0) of the mirror movement pattern, along line B.

However, at point 2', the vertical (FIG. 4) or horizontal (FIG. 5) axis of point 2 is intersected (either $a_X=a_C$ or $b_Y=b_C$), upon which occurrence the mirror then is moved under the control of the algorithm along the necessary axis (vertical for FIG. 4 and horizontal for FIG. 5) under the driving action of only one motor until point 2 (the center) is actually achieved (both $a_X=a_C$ and $b_Y=b_C$) along line C.

The mirror then travels along line D under the driving action of both motors 11 and 12 until the vertical (FIG. 4) or horizontal (FIG. 5) axis intersection point 3' of the final position is reached (either $a_X=a_F$ or $b_Y=b_F$). From there the mirror moves along line E under the action of only one motor until the final, desired position point 3 ($a_F$, $b_F$) is achieved (both $a_X=a_F$ and $b_Y=b_F$).

It is noted that, although the mirror of each figure has traveled a greater distance than a straight line path (the shortest distance between two points being a straight line), the mirror travel has in fact wasted very little time by moving to the "center" before the desired position.

It also should be noted that the "center" does not have to be the exact, geometrical center position (0, 0) of the mirror, but rather a "safe" center region or central position, i.e., one from which the logic of the system determines that no further obstruction could occur in then moving toward the final or memory position.

It is also noted that the embodiment of FIG. 5 is fast, although not be the fastest possible, but it is far simpler than the "fastest" possible method and is currently preferred.

The foregoing described "forty-five degree" algorithm of FIG. 2 assumes that the two direction motors driving the mirror movement are of equal speeds. However, the innovative principles of the foregoing algorithm will also work if one of the direction motors operates at a faster rate than the other. The only affect of the speed difference is that the angle of the initial movement(s) will be greater or less than forty-five ($>$ or $<45°$) degrees, depending on the relative rates or speeds of the direction motors. For example, if the direction motor for the vertical axis has a speed of "Y," and the direction motor for the other, horizontal axis has a speed of "X," then the algorithm would use an angle of "arc tangent (Y÷X)" for the angle of the initial, driving movement(s). The general key is to have the longest possible distance traveled with both motors being "on" in order to achieve a quicker time.

From the foregoing, it should be clear that:

1. the mirror movement algorithm is adaptable to most mirror movement patterns;

2. the exemplary algorithm is adaptable to accept mirrors in which one direction motor may operate at a different speed than the other direction motor;

3. the algorithm compensates for obstructions caused by traveling near the edges of different mirror movement patterns, and the final desired position will therefore always be reached by using a "centering" sub-routine in the algorithm, if the normal path of travel is obstructed; and 4. the algorithm is unique and relatively uncomplicated, and it requires minimal modifications for the "centering" feature in terms of additional memory or executable instructions and calculations (compare left side and right side routines of FIG. 2, whose analogous steps lend themselves to programming modularity).

It should be understood that, in using the terms "horizontal" and "vertical" herein, reference is being made to those terms in a relative, and not an absolute, sense. For example, typically a mirror is mounted in a canted position, i.e., when in its neutral or mid-point position, its "vertical" and/or "horizontal" axes of movement are not in fact vertical and/or horizontal to the earth's surface.

Although this invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

I claim:

1. In an electrically powered mirror control system, including
    an electrically powered mirror of the "memory" type having at least two position motors driving it about two axes, a first axis (a) and a second axis (b), with each motor having an "on"/"off" switch associated therewith; and
    a memory module, in which at least one selected "memory" position ($a_F$, $b_F$) for the mirror with respect to the axes is encoded;
the improvement comprising:
    mirror position sensor elements which produce electrical signals indicative of the position ($a_X$, $b_Y$) of the mirror with respect to the two axes at a particular point in time;
    a computational and control module associated with said sensor elements, the memory module, the motors and the switches, and having comparators for comparing an initial position ($a_I$, $b_I$) of the mirror determined by said sensor elements with the "memory" position of the mirror and determining the relative direction of the "memory" position from the initial position, from the relative values of the positions with respect to the axes, and cyclically monitoring the sensed current position of the mirror from the signals from said sensor elements, and generating signals
    turning both of the motors "on" through the switches in the directions which moves the mirror toward the "memory" position ($a_F$, $b_F$), monitoring the changing position ($a_X$, $b_Y$) of the mirror with respect to the axes by the comparators comparing the changing mirror position ($a_X$, $b_Y$) to the "memory" position ($a_F$, $b_F$), and maintaining both of the motors "on" until at least one of the relationships $a_X = a_F$ and $b_Y = b_F$ is satisfied;
    turning "off" the motor which moves the mirror about the axis for which the relationship is satisfied; and
    turning "off" the other motor when the other relationship is satisfied;
moving the mirror from its initial position ($a_I$, $b_I$) toward the "memory" position ($a_F$, $b_F$).

2. The improvement of claim 1, wherein:
    the axes are orthogonal; and
    the mirror moves with a forty-five (45°) degree angle with respect to both of the axes in its initial movement from said initial position ($a_L$, $b_L$) initially toward the "memory" position ($a_F$, $b_F$).

3. The improvement of claim 1, wherein the position motors have differing rates of movement of the mirror about their respective axes, the horizontal axis one having a speed of "X" and the other, vertical axis motor having a speed of "Y" and wherein:
    the mirror moves with an angle with respect to the horizontal axis of "arc tangent (Y÷X)" in its initial movement from said initial position ($a_L$, $b_L$) initially toward the "memory" position ($a_F$, $b_F$).

4. The improvement of claim 1, wherein said computational and control module includes:
    a sub-module which generates signals representative of a central position ($a_C$, $b_C$) of the mirror; and, when said mirror engages an obstruction in its movement, said computational and control module further utilizing said comparators for comparing the obstructed position ($a_O$, $b_O$) of the mirror with respect to the central position of the mirror and determining the relative direction of the central position from the obstructed position by the comparators comparing the relative values of the positions with respect to said axes;
and further generates signals:
    turning both said motors "on" through said switches in the directions which move the mirror toward the central position ($a_C$, $b_C$), monitoring the changing position ($a_X$, $b_Y$) of the mirror with respect to the axes by the comparators comparing the changing mirror position ($a_X$, $b_Y$) to the central position ($a_C$, $b_C$), and maintaining both of the motors "on" until at least one of the relationships $a_X = a_C$ and $b_Y = b_C$ is satisfied;
    turning "off" the motor which moves the mirror about the axis for which the relationship is satisfied; and
    continuing the other motor "on" at least until the other relationship is satisfied;
said comparators of said computational and control module further comparing the central position of the mirror with respect to the "memory" position ($a_F$, $b_F$) of the mirror and said computational and control module determining the relative direction of the "memory" position from the current, central position ($a_C$, $b_C$), said computational and control module further generating signals
    turning the "off" motor(s) "on" through said switches in the directions which moves the mirror toward the "memory" position ($a_F$, $b_F$), monitoring the changing position ($a_X$, $b_Y$) of the mirror with respect to the axes by comparing the changing mirror position ($a_X$, $b_Y$) to the "memory" position ($a_F$, $b_F$), and maintaining both of the motors "on"

until at least one of the relationships $a_X=a_F$ and $b_Y=b_F$ is satisfied;

turning "off" the motor which moves the mirror about the axis for which the relationship is satisfied; and turning "off" the other motor when the other relationship is satisfied;

moving the mirror from its initial position ($a_I$, $b_I$) to its "memory" position ($a_F$, $b_F$).

5. The improvement of claim 4, wherein:
   the axes are orthogonal; and
   the mirror moves with a forty-five (45°) degree angle with respect to both of the axes in its movement from said initial position ($a_L$, $b_L$) initially toward the "memory" position ($a_F$, $b_F$).

6. The improvement of claim 4, wherein:
   the axes are orthogonal; and
   the mirror moves with a forty-five (45°) degree angle with respect to both of the axes in its initial movement from said central position ($a_C$, $b_C$) initially toward the "memory" position ($a_F$, $b_F$).

7. The improvement of claim 4, wherein said position motors have differing rates of movement of the mirror about their respective axes, the horizontal axis one having a speed of "X" and the other, vertical axis motor having a speed of "Y" and wherein:
   the mirror moves with an angle with respect to the horizontal axis of "arc tangent $(Y \div X)$" in its movement from said initial position ($a_L$, $b_L$) initially toward the "memory" position ($a_F$, $b_F$).

8. The improvement of claim 4, wherein said position motors have differing rates of movement of the mirror about their respective axes, the horizontal axis one having a speed of "X" and the other, vertical axis motor having a speed of "Y" and wherein:
   the mirror moves with an angle with respect to the horizontal axis of "arc tangent $(Y \div X)$" in its initial movement from said central position ($a_C$, $b_C$) initially toward the "memory" position ($a_F$, $b_F$).

9. The improvement of claim 4, wherein:
   the obstruction is indicated when, over a period of time covering a multiple number of cycles, the sensed current mirror position being measured by the sensor elements remains constant ($a_X=k_1$ and $b_Y=k_2$, where $k_1$ and $k_2$ are constants).

10. The improvement of claim 4, wherein:
    said central position is the center of the mirror in its neutral, mid-way position.

11. A method of controlling the movement of an electrically powered mirror including
    an electrically powered mirror of the "memory" type having at least two direction motors driving it about two axes, a first axis (a) and a second axis (b), with each motor having an "on"/"off" switch associated therewith;
    mirror position sensor elements which produce electrical signals indicative of the current position ($a_X$, $b_Y$) of the mirror with respect to the two axes;
    a memory module, in which at least one selected "memory" position ($a_F$, $b_F$) for the mirror with respect to the axes is encoded; and
    a computational and control module associated with the sensor elements, the memory module, the motors and the switches and having comparators, comprising the following steps:
    (a) comparing the initial position ($a_L$, $b_L$) of the mirror with the "memory" position of the mirror and determining the relative direction of the "memory" position from the initial position, from the relative values of the positions with respect to the axes, and generating signals;
    (b) turning both of the motors "on" through the switches in the directions which moves the mirror toward the "memory" position ($a_F$, $b_F$), cyclically monitoring the changing position ($a_X$, $b_Y$) of the mirror with respect to the axes from the signals from the sensor elements and using the comparators to compare the changing mirror position ($a_X$, $b_Y$) to the "memory" position ($a_F$, $b_F$) on a cyclical basis, and maintaining both of the motors "on" until at least one of the relationships $a_X=a_F$ and $b_Y=b_F$ is satisfied;
    (c) turning "off" the motor which moves the mirror about the axis for which the relationship is satisfied; and
    (d) turning "off" the other motor when the other relationship is satisfied; moving the mirror from its initial position ($a_L$, $b_L$) toward the "memory" position ($a_F$, $b_F$).

12. The method of claim 11, wherein the axes are orthogonal; and wherein in step "b" there is included the step of:
    moving the mirror in a forty-five (45°) degree angle with respect to both of the axes in its initial movement from said initial position ($a_L$, $b_L$) initially toward the "memory" position ($a_F$, $b_F$).

13. The method of claim 11, wherein the direction motors have differing rates of movement of the mirror about their respective axes, the horizontal axis one having a speed of "X" and the other, vertical axis motor having a speed of "Y" and wherein:
    the mirror moves with an angle with respect to the horizontal axis of "arc tangent $(Y \div X)$" in its movement from its initial position ($a_L$, $b_L$) initially toward the "memory" position ($a_F$, $b_F$).

14. The method of claim 11, wherein the computational and control module includes a sub-module which generates signals representative of a central position ($a_C$, $b_C$) of the mirror; and wherein there is included the further sub-steps of:
    when said mirror engages an obstruction in its movement, comparing the obstructed position ($a_O$, $b_O$) of the mirror with the central position of the mirror utilizing the comparators and determining the relative direction of the central position from the obstructed position by comparing the relative values of the positions with respect to the axes; and
    turning both said motors "on" through said switches in the direction which move the mirror toward the central position ($a_C$, $b_C$), monitoring the changing position ($a_X$, $b_Y$) of the mirror with respect to the axes by the comparators comparing the changing mirror position ($a_X$, $b_Y$) to the central position ($a_C$, $b_C$), and maintaining both of the motors "on" until at least one of the relationships $a_X=a_C$ and $b_Y=b_C$ is satisfied;
    turning "off" the motor which moves the mirror about the axis for which the relationship is satisfied; and
    continuing the other motor "on" at least until the other relationship is satisfied; and
    further comparing the central position of the mirror with respect to the "memory" position ($a_F$, $b_F$) of the mirror and determining the relative direction of the "memory" position from the current, central position ($a_C$, $b_C$); and turning the "off" motor(s) "on" through said switches in the directions which moves the mirror toward the "memory" position ($a_F$, $b_F$), monitoring the changing position ($a_X$, $b_Y$) of the mirror with respect to the axes by comparing the changing mirror position ($a_X$, $b_Y$) to the "memory" position ($a_F$, $b_F$), and maintaining both of the motors "on" until at least one of the relationships $a_X=a_F$ and $b_Y=b_F$ is satisfied;

turning "off" the motor which moves about the axis for which the relationship is satisfied; and turning "off" the other motor when the other relationship is satisfied;

moving the mirror from its initial position ($a_I$, $b_I$) to its "memory" position ($a_F$, $b_F$).

15. The method of claim 14, wherein the axes are orthogonal; and wherein in step "b" there is included the step of:

moving the mirror in a forty-five (45°) degree angle with respect to both of the axes in its movement from said initial position ($a_L$, $b_L$) initially toward the "memory" position ($a_F$, $b_F$).

16. The method of claim 14, wherein the direction motors have differing rates of movement of the mirror about their respective axes, the horizontal axis one having a speed of "X" and the other, vertical axis motor having a speed of "Y" and wherein:

the mirror moves with an angle with respect to the horizontal axis of "arc tangent ($Y \div X$)" in its movement from said initial position ($a_L$, $b_L$) initially toward the "memory" position ($a_F$, $b_F$).

17. The method of claim 14, wherein the direction motors have differing rates of movement of the mirror about their respective axes, the horizontal axis one having a speed of "X" and the other, vertical axis motor having a speed of "Y" and wherein:

the mirror moves with an angle with respect to the horizontal axis of "arc tangent ($Y \div X$)" in its movement from said central position ($a_C$, $b_C$) initially toward the "memory" position ($a_F$, $b_F$).

18. The method of claim 14, wherein there is included the step of:

determining if, over a period of time covering a multiple number of cycles, the sensed current mirror position being measured by the sensor elements remains constant ($a_X=k_1$ and $b_Y=k_2$, where $k_1$ and $k_2$ are constants) and, when the position so remains constant and at least one motor is "on," initiating said sub-steps.

* * * * *